(12) United States Patent
Muro et al.

(10) Patent No.: US 10,839,429 B2
(45) Date of Patent: Nov. 17, 2020

(54) SYSTEM AND METHOD FOR IDENTIFYING MEMBERS OF A DYNAMIC TARGET SEGMENT

(71) Applicant: Capital One Services, LLC, McLean, VA (US)

(72) Inventors: Erik Muro, Chicago, IL (US); Alec Fekete, Naperville, IL (US); Graham Cantor-Cooke, McLean, VA (US); Steven Cao, McLean, VA (US); Jonathan Chao, Chicago, IL (US); Asif Khan Zinab Patan, McLean, VA (US); Prashant Mehrotra, Glenview, IL (US); Deepthi Potluri, Palatine, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/162,372

(22) Filed: Oct. 16, 2018

(65) Prior Publication Data
US 2020/0118176 A1   Apr. 16, 2020

(51) Int. Cl.
*G06Q 30/02*   (2012.01)

(52) U.S. Cl.
CPC ..... *G06Q 30/0276* (2013.01); *G06Q 30/0204* (2013.01); *G06Q 30/0242* (2013.01); *G06Q 30/0251* (2013.01)

(58) Field of Classification Search
CPC ........... G06Q 30/0276; G06Q 30/0204; G06Q 30/0242; G06Q 30/0251
See application file for complete search history.

(56) References Cited

U.S. PATENT DOCUMENTS

| 5,966,695 | A | 10/1999 | Melchione et al. |
|---|---|---|---|
| 7,003,476 | B1 | 2/2006 | Samra et al. |
| 2008/0300962 | A1* | 12/2008 | Cawston .......... G06Q 10/06311 705/7.13 |
| 2010/0211415 | A1* | 8/2010 | Tholl ................. G06Q 40/08 705/4 |
| 2012/0041817 | A1* | 2/2012 | Priyadarshan ..... G06Q 30/0244 705/14.43 |
| 2015/0161670 | A1* | 6/2015 | Shen ................. G06Q 30/0275 705/14.66 |

OTHER PUBLICATIONS

Jenkinson, Angus. What happened to strategic segmentation? Journal of Direct, Data, and Digital Marketing Practice, vol. 11, pp. 124-139 (2009). Available at https://link.springer.com/article/10.1057/dddmp.2009.27. (Year: 2009).*

* cited by examiner

*Primary Examiner* — Katherine Kolosowski-Gager (57) ABSTRACT

A campaign server disclosed herein includes a graphic user interface (GUI) and underlying campaign server functionality that together enable a user to build, execute and analyze the results of a campaign with increased ease and accuracy. The campaign server advantageously includes a segmentation engine which operates to dynamically update target segment population data. The campaign server GUI enables the user to construct the campaign content and to launch the campaign towards members of the dynamically updated target segment. The campaign server further operates to collect and present campaign results to the user.

7 Claims, 9 Drawing Sheets

SYSTEM AND METHOD FOR IDENTIFYING MEMBERS OF A DYNAMIC TARGET SEGMENT

BACKGROUND

Companies invest in marketing campaigns to attract or otherwise influence existing and potential customers. It is important to track a campaign's effectiveness to ensure that the campaign efforts are worthwhile. One aspect of a campaign analyst's job is to monitor campaign results, altering components of the campaign, such as the campaign's audience, communication platform, etc., to tailor and direct the campaign in a manner that maximizes campaign results.

One problem encountered by the analyst is accurately identifying which members of a population are most likely to be influenced by the campaign. Campaign efforts are best spent on that segment of the population most likely to purchase a marketed product or service. When populations are large, identifying the members of a target segment can be extremely time-consuming, often comprising a majority of an analyst's workload and taking days or weeks to complete. Because populations are dynamic, when a campaign is finally ready to launch, the previously identified target population may have changed, resulting in misdirection of at least a portion of campaign efforts and thereby reducing its effectiveness.

SUMMARY

According to one aspect of the invention, a campaign management system includes a user interface for receiving requests from a user relating to a campaign to be directed at a target segment of a population. A campaign build unit is coupled to receive instructions from the user interface to allow the user to manage the campaign. The campaign build unit includes a segment identification engine to dynamically update the target segment of the population against which the campaign is to be applied. The segment identification engine includes a query builder configured to translate one or more instructions received from the user and relating to the target segment, into a list of one or more database queries comprising a script and a data interface, the data interface configured to periodically and automatically execute the script upon a coupled dynamic data source and to capture changes to the target segment for use by the campaign build unit. The system further includes a campaign execution engine configured to launch a campaign built in accordance with user instructions and applied against the dynamically updated target segment. With such an arrangement, by periodically and/or automatically updating the target segment to which a campaign is directed, campaign efficiencies and effectiveness are increased.

According to another aspect of the invention, a method for dynamic campaign management includes the steps of receiving segmentation instructions from a user, the segmentation instructions identifying a desired target segment of a population for delivery of a campaign and translating the segmentation instructions into a script of database queries. The method further includes the steps of identifying members of a dynamic target segment by periodically and automatically executing the script on a dynamic data store to capture changes to members of the dynamic target segment, receiving campaign instructions from a user; and in response to the campaign instructions, generating campaign correspondence for delivery to the dynamic target segment.

According to a further aspect of the invention, a method of generating a customized campaign by a user includes the steps of accessing a graphic user interface of a campaign sever and identifying, at the graphic user interface, a target segment population for the customized campaign. The method includes the steps of receiving information related to members of the target segment population from a campaign server. The method further includes selecting parameters of the customized campaign, and, in response to the selected parameters, receiving campaign correspondence and launching the customized campaign, including receiving updated information relating to members of the target segment population that captures changes to the target segment population and represents current members of the target segment, and forwarding the campaign correspondence to the current members of the target segment population. With such an arrangement, it can be ensured that campaigns are not distributed based on stale target data.

DETAILED DESCRIPTION

According to one aspect of the invention, a campaign server includes a graphic user interface (GUI) and underlying campaign server functionality that together enable a user to build, execute and analyze the results of a campaign with increased ease and accuracy. In a preferred embodiment, the campaign server advantageously includes a segmentation engine that operates to dynamically update target segment population data. The campaign server GUI enables the user to construct the campaign content and to launch the campaign towards members of the dynamically updated target segment. The campaign server further operates to collect and present campaign results to the user. With such an arrangement, the ease of construction, accuracy, and associated effectiveness of a campaign may be increased.

Figure 1:
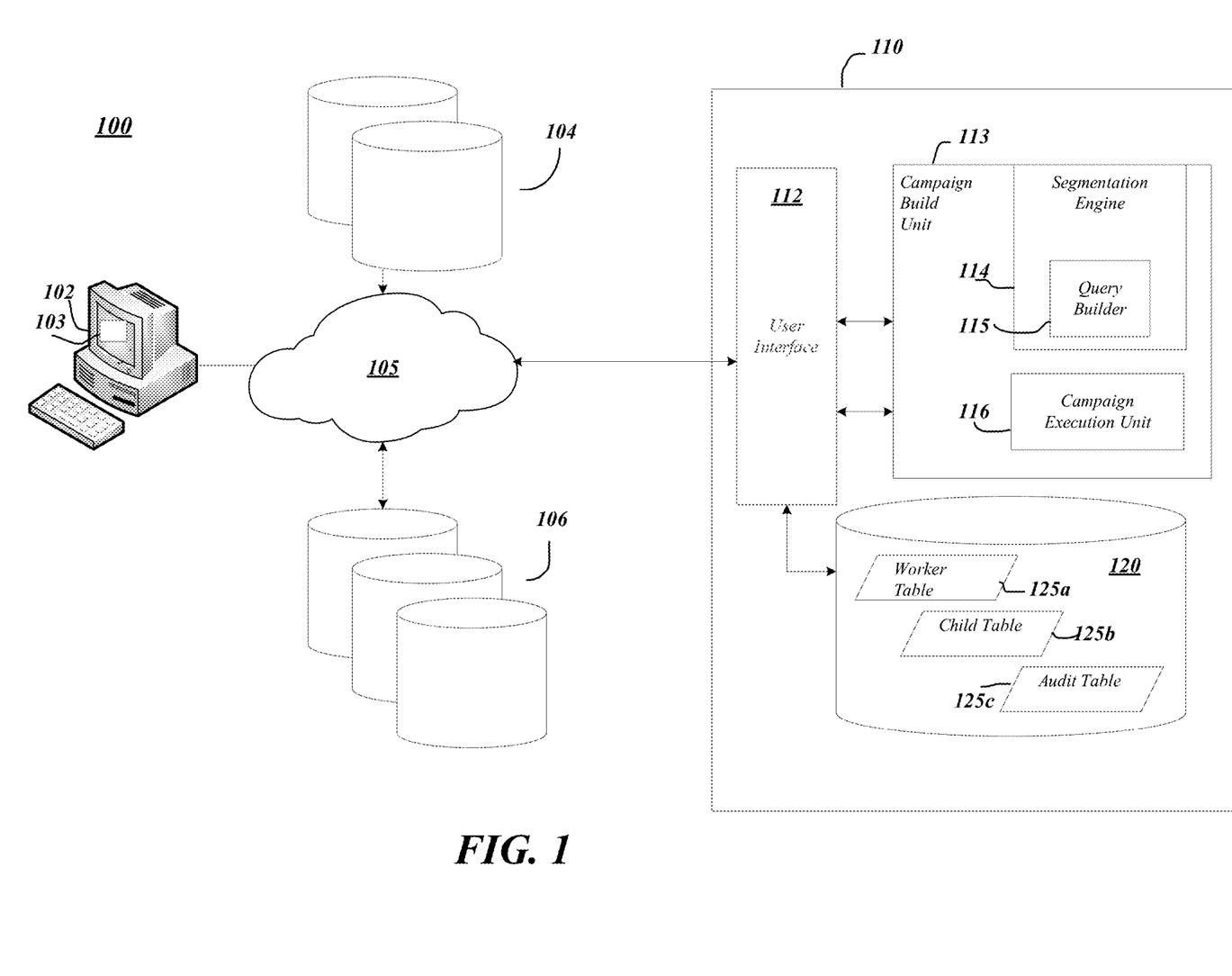
FIG. 1 is a block diagram illustrating exemplary components of a network including a campaign server of the present invention.

FIG. 1 is a block diagram of a system 100 including one embodiment of a campaign server 110 shown coupled to a user workstation 102 and a plurality of data stores 104, 106 by network 105. In this embodiment, the data stores 104, 106 represent a distributed collection of data sources including existing information related to members of potential campaign populations that may be leveraged for marketing purposes. Workstation 102 is a computing device capable of displaying information and options to the user and communicating campaign build instructions from the user to the campaign server 110.

Campaign server 110 includes a user interface 112 coupled to campaign build unit 113 and local storage 120. According to one aspect of the invention, the user interface 112 drives a graphic user interface (GUI) comprising a plurality of hierarchically linked campaign windows which are visible to a user accessing the campaign services and are adapted to receive information from and provide information to the user.

For purposes of this application, a 'window' shall mean a visual area of a user display screen, controlled by the campaign server 110, and including one or more tabs, buttons, data entry fields, result display portions, etc. for the exchange of campaign information between the user and the server 110. The visual area of the user display screen is controlled by a browser program, which interacts with the campaign server to display server content at the monitor of the user.

GUI 103 enables a user to manage functions performed by the campaign build unit 113 and to review and analyze campaign return data stored in local storage 120.

Campaign build unit 113 includes a segmentation engine 114 with query builder 115 and a campaign execution unit 116. In one embodiment the segmentation engine 114 operates to dynamically update target population data by periodically executing preidentified search queries on the current population data set. The periodically updated target population data may be stored in tables readily accessible to the campaign server, for example, Worker Table 125a, Child Table 125b and Audit Table 125c, each described in more detail below.

The campaign execution unit 116 operates to build campaign content in response to user input and pre-stored communication content, and, responsive to input from the segmentation engine, to broadcast the campaign content to the appropriate members of the updated target segment of the population.

Figure 2:
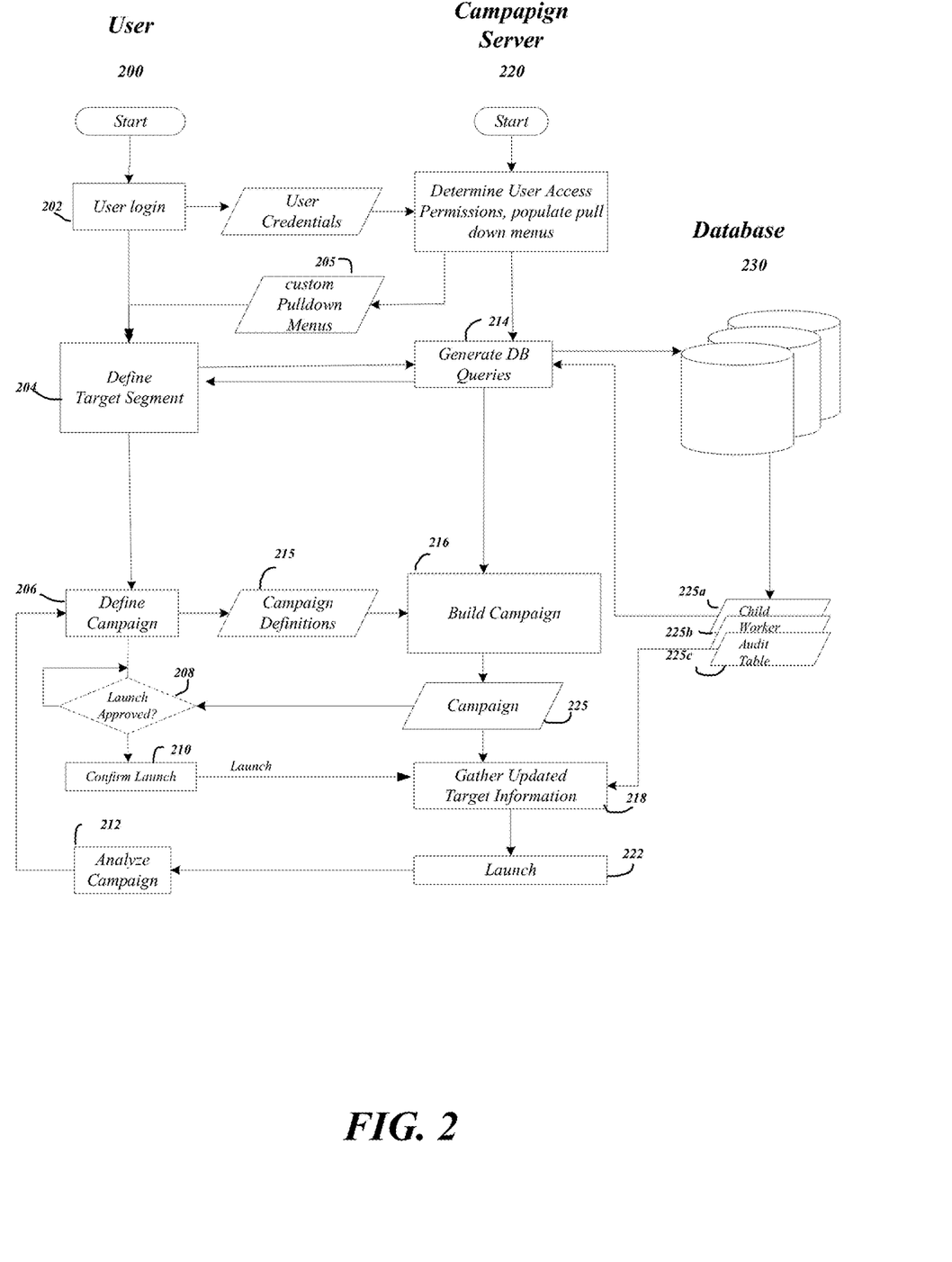
FIG. 2 is a data flow diagram illustrating exemplary steps that may be performed by a client and a campaign server such as that of FIG. 1.
Figure 3A:
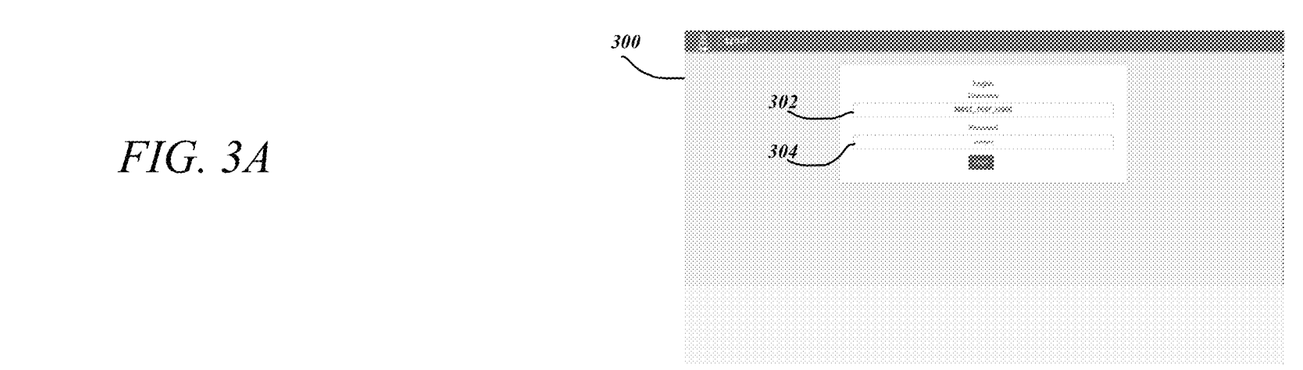
FIG. 3A and FIG. 3B illustrate exemplary input windows of a graphic user interface for accessing functional components of the campaign server of FIG. 1.

Referring now to FIG. 2, a data flow diagram is provided to illustrate steps that may be performed and data that may be exchanged between a user 200, a campaign server 220 of the present invention, and a database 230 as each perform their respective workflows according to aspects the invention. At step 202 a campaign process is initiated by a user login to a campaign server website using client workstation 102. As part of the login, the user forwards credentials 101 to the campaign server 220. The campaign server may use the credentials to control user access to populations, campaign content, campaign results or any other data available to the campaign server. In one embodiment, the campaign server 110 may use the credentials as a filter when populating pull down population menus 205 for the user. For example, FIG. 3A illustrates a login window 300 that could be displayed to a user as part of GUI 103. This login window 300 accepts a user name 302 and password 304 for permitting a user to have access to as subset of data, content and/or tools according to the authorization profile of the user.

Figure 3B:
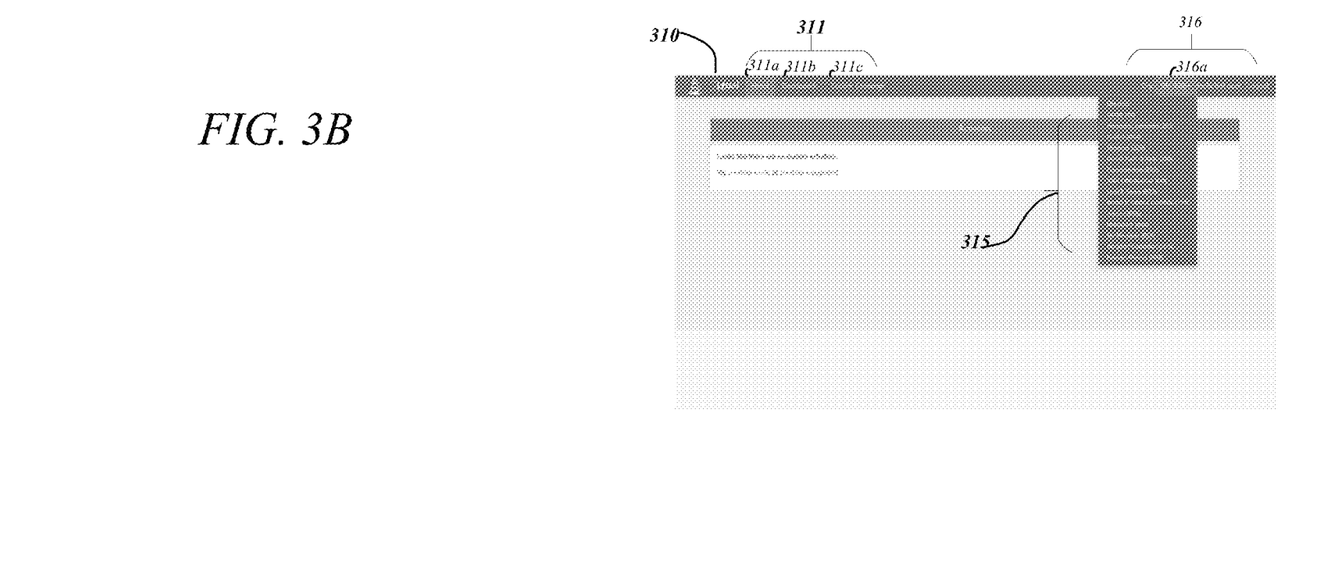

FIG. 3B is an image of an exemplary a landing window 310 of a campaign server. The landing window 310 in one embodiment includes service tabs 311 and settings 316. The service tabs are used to navigate between landing windows of various campaign services, for example as shown here a home tab 311a, a dashboard tab 311b, and a custom campaign tab 311c. The landing window 310 is also shown to include user-specific selectors, including user selector 316a. In the embodiment of FIG. 3B, selection of 316a generates a filtered pull-down list 315 of clients for whom a user is authorized to prepare campaigns.

Referring back to FIG. 2, steps 204 and 206 include various tasks undertaken by the user to build and target a campaign. Although steps 204 and 206 are shown as sequential in FIG. 2, the present invention is not limited to any particular order of operation of campaign creation steps; rather, the GUI interface permits users to drive campaign creation according to their own preferences, switching back and forth between input windows to tailor results, thereby allowing increased customization of campaign build experiences.

Figure 4:
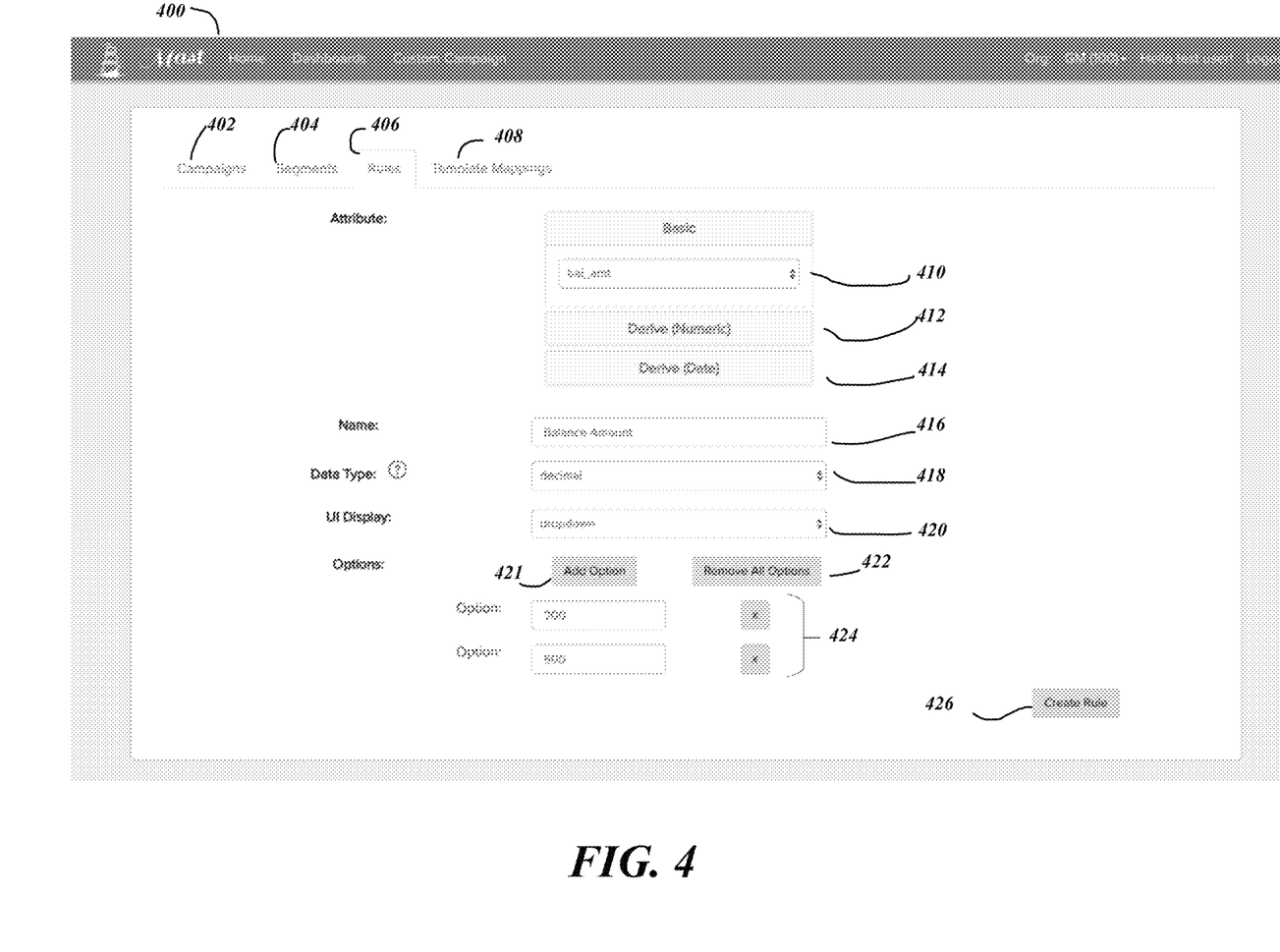
FIG. 4 illustrates an exemplary window of the graphics user interface illustrating various functional tabs for controlling different functions of the campaign server of FIG. 1.

For example, in one embodiment selecting the dashboard tab 311b of landing window 310 (shown in FIG. 3B) brings the user to dashboard window 400 of FIG. 4. Dashboard window 400 includes links that enable a user to easily switch between campaign content control, campaign segmentation control, campaign execution control and campaign viewing control functionality. For example, the dashboard window 400 is shown to include four tabs: campaign tab 402, segment tab 404, rules tab 406 and template mapping tab 408. Selection of one of the tabs results in a display of control options related to the tab functionality for personalizing the campaign.

Window 400 is one that may be displayed by selecting rules tab 406. Rules tab 406 allows the user to define one or more rules that may be used to exclude members of the population from the target segment based on desired attributes of a target population. The attributes may be selected from a group of basic, pre-existing attributes of members of the population. The list of pre-existing attributes may be provided as options to the user in the form of a pull-down menu such as pull-down menu 410. Alternatively, according to one aspect of the invention, the campaign server may derive attribute data from pre-existing information of the population. For example, button 412 may be used to dynamically generate a new attribute that is a combination of two 410 attributes. This feature may be used, for example, to enable a user may build a target a population comprising customers that have made two purchases within 30 days, by selecting attribute 1 (second purchase date) subtract attribute 2 (first purchase date) and a compare operator (is less than or equal to 30). Button 414 may be selected to target a population by deriving the members of the population which joined the population before the year 2000. The GUI thus provides the user the ability to quickly formulate complex targeting rules that narrowly tailor the delivery of their campaign to the most appropriate consumers. In addition to attribute definition, the rules window 400 also includes name field 416, data type field 418, UI display format field 420, and option input buttons and fields 421, 422 and 424. Name field 416 allows the user to enter a name for the segmentation rule associated with the attributes and option input of the screen. Data type field 418 permits a user to specify the format of return of information related to their target segment. UI display field 420 permits the user to customize the manner of display of the target segment. Option buttons 421 and 422 respectively enable to user to add and remove options from the target segment. Selection of the 'add option' button 421 generates one or more input fields 424, which accept manual input relating to filtering criteria for the population. Once the user is satisfied with the parameters of the rule, the user selects button 426 ("Create Rule"), and the rule will be made available to the user for defining population segments.

It should be noted that the various buttons and pull-down menus of FIG. 4 are provided by way of illustration only should not be construed as limiting the scope of the present invention. Other manifestations of an interface which enable a user to input complex definitions of target population metrics using tailored or derived attribute information to define members falls within the scope of the present invention.

Figure 5:
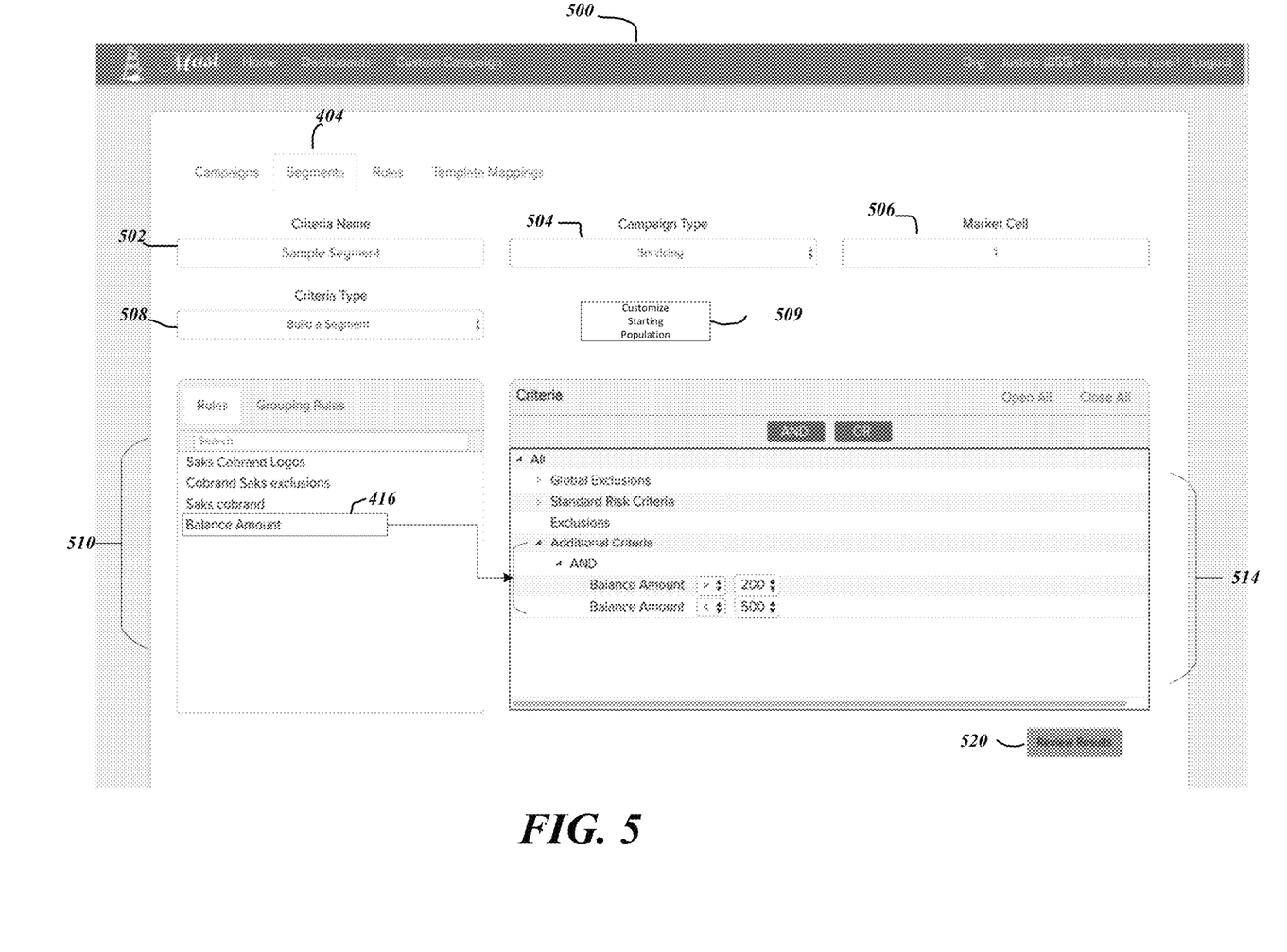
FIG. 5 illustrates an exemplary window of a graphics user interface that permits a user to tailor population segmentation.

FIG. 5 is a diagram illustrating an exemplary window that may be used to control the application of rules, such as those generated under the rules tab window 400 (FIG. 4), to a population to identify a target segment. FIG. 5 can be accessed by selection of the segment tab 404 of the dashboard 400. Segment tab window 500 is shown to include several segment creation input fields, such as criteria name field 502, campaign type pull-down 504, market cell field 506 and criteria type pull-down 508. Criteria name 502 allows a user to define a name of the target segment. Campaign type 504 is selected from a list of available campaign types, including but not limited to Marketing, collections and non-critical servicing type campaigns, each of which may have pre-stored content delivery options for use by to the user. Market cell input 506 is used to identify a number of markets against which the campaign is to be applied. Criteria Type field 508 permits a user to select from a pull-down menu including the options of "Grouping Rules" or "Build a Segment," which characterize the application of the criteria upon the population data set. Alternatively, a "Customize Starting Population" button 509 allows a user to customize a starting population for the target population. For example, a user can select if the starting population is from a previous campaign or the whole dataset for the client.

Grouping rule sub-window 510 is generated in response to input from the user in fields 502 through 509. The rules that may be available to the user for segmenting the population may include standard rules, or a more complex rule that is a concatenation of multiple discrete rules. Grouping rule sub-window 510 lists both pre-existing rules and exclusions, as well as the custom rules generated by the user as described in FIG. 4, including custom rule 416.

The user selects to add or exclude members from the target population by adding rules using Boolean operators to the search criteria, the results of which are displayed in window 514. Once the user has selected the rules to apply to against the populations, the user selects result button 520. Returning briefly to FIG. 2, when at step 204 the user defines the target segment by adding rules and tailoring segments using the features of the campaign server discussed in FIG. 4 and FIG. 5, the user input is forwarded from user 200 to the campaign server 220. According to one embodiment, the user instructions are forwarded as JavaScript Object Notation (JSON) objects. JSON is an open-standard file format that uses human-readable text to transmit data objects consisting of attribute-value pairs and array data types (or any other serializable value). It is a common data format used for asynchronous browser-server communication, including as a replacement for XML in some AJAX-style systems.

At step 214 the campaign server 220 translates the JSON instructions into SQL, a common database query language, and forwards the query to the coupled databases 230 housing population information. According to one aspect of the invention, query results are stored in one or more tables, such as tables 25a-25c, accessible to permit the campaign server to deliver the results to the user. The results of the tables are continuously periodically and automatically updated in response to standard and custom database queries. As a result, the tables 25a-25c always store up-to-date population segment data.

According to one aspect of the invention, there are three types of tables that are updated in response to database queries; a worker table 25a, one or more child tables 25b and an audit table 25c. The Worker Table 25a is a daily truncate and load table that includes one or more attributes of all members of a population which are to be targeted by a campaign. A child table 25b comprises a subset of the data in the worker table but omits members according to rules and exclusion criteria of a campaign. An audit table is a table generated daily to includes count information identifying the number of records removed between a worker and child table for each exclusionary criterion. Although the worker, child and audit tables are described herein, it can be appreciated that the use of particular data tables is a matter of design choice and the present invention is not limited to the use of any particular type of data to store population information. In addition, although the tables above are updated daily, any periodic frequency deemed appropriate for capturing changes to member populations is within the scope of the present invention.

Figure 6:
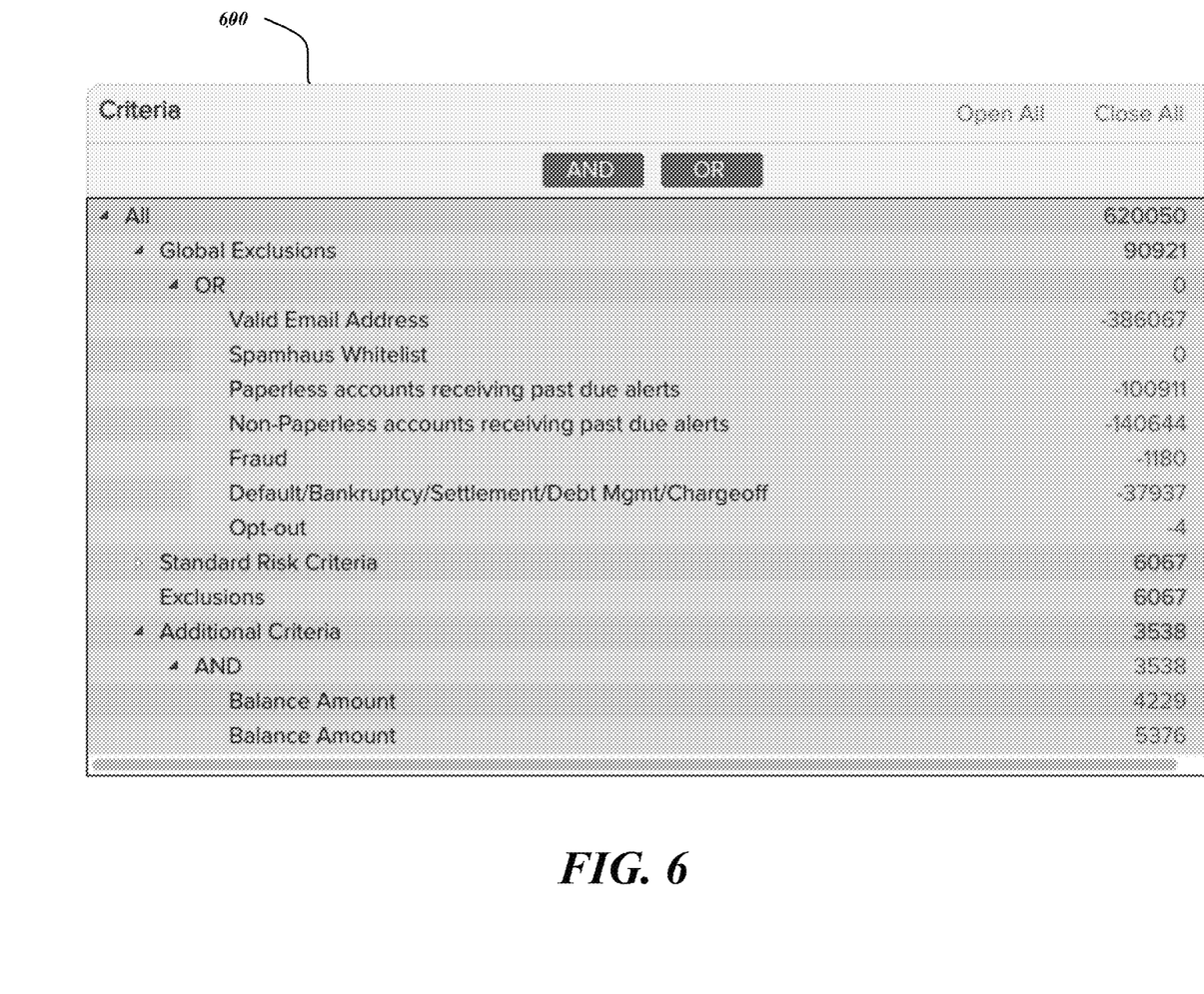
FIG. 6 illustrates one example of results that may be generated by applying functions made available to the user by the GUI of FIG. 5 on a population dataset.

FIG. 6 illustrates an example of results that may be provided to a user as they tailor their target campaign population. Window 600 displays a list of criteria and a total number of the population that satisfy each of the target criteria. The user can, therefore, understand with increased accuracy the size and breadth of dissemination of their campaign. The user may then switch between the rule tabs and segment tabs, reviewing the results, until they have identified the appropriate criteria for their desired target population.

Figure 7:
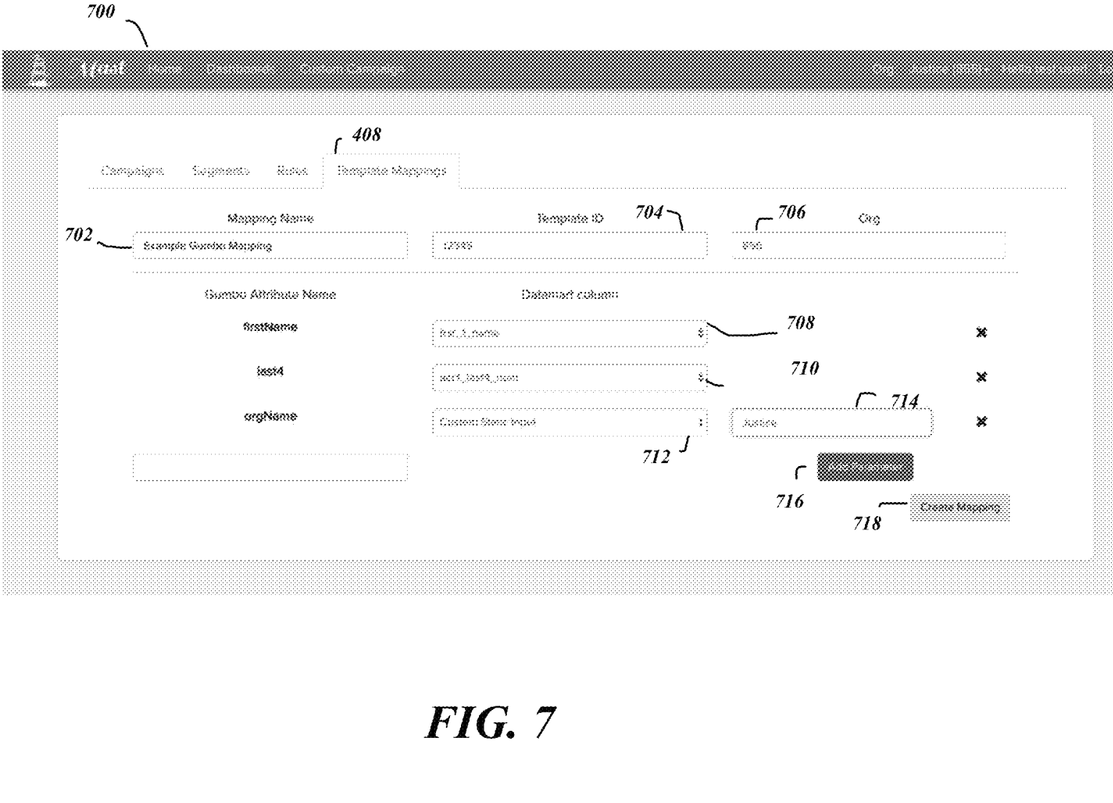
FIG. 7 illustrates an exemplary window of a graphics user interface that permits a user to define campaign correspondence parameters as part of the campaign service of FIG. 1.

Referring back to FIG. 2, once the rules and criteria have been finalized to produce a desired target population, (or concurrently while the client is defining their target population), a user may further access to the campaign server to generate campaign content. FIG. 7 illustrates an example of a campaign server website window that may provide control functionality to the user to enable them to control campaign content.

Window 700 is a landing window of a template mapping service that is available to a user when selecting the template mapping tab 408 from the dashboard of FIG. 4. In one embodiment, the template mapping service enables a user to generate campaign content using pre-generated correspondence templates. The template mapping service includes input fields identifying the correspondence, input fields used to populate the correspondence, and input fields related to the origin of the correspondence. For example, input fields identifying the correspondence include a name field 702, a template identifier of the type of correspondence to be used in field 704 and the originating organization 706 for the correspondence. Once a template ID is provided, the window 700 is updated to display a list of attributes of the correspondence, where the attributes here refer to the various fields of the correspondence which are to be automatically populated with data from the data source. In the example of FIG. 7, three fields 708, 710 and 712 require population by the user. The user populates the fields using a pull-down menu that maps desired attribute to the data field in the data store storing the attribute information. The template mapping service advantageously includes input controls to permit a user to input a static value to appear in their content (for example, as shown with fields 712 and 714). Also, the template mapping service advantageously permits a user to add additional parameters via button 716 to further customize their correspondence. Once the user is satisfied with the content of their campaign, they can select button 720 to map the proffered data into the campaign template.

Although FIG. 7 illustrates the generation of only one template map; it can be appreciated that the interface of FIG. 7 may be used to generate multiple correspondences and other content for a campaign. In addition, a user may desire to use a template mapping in more than one campaign. Once the user has generated a template, and identified a target population, the user is ready to generate and launch the campaign.

Figure 8:
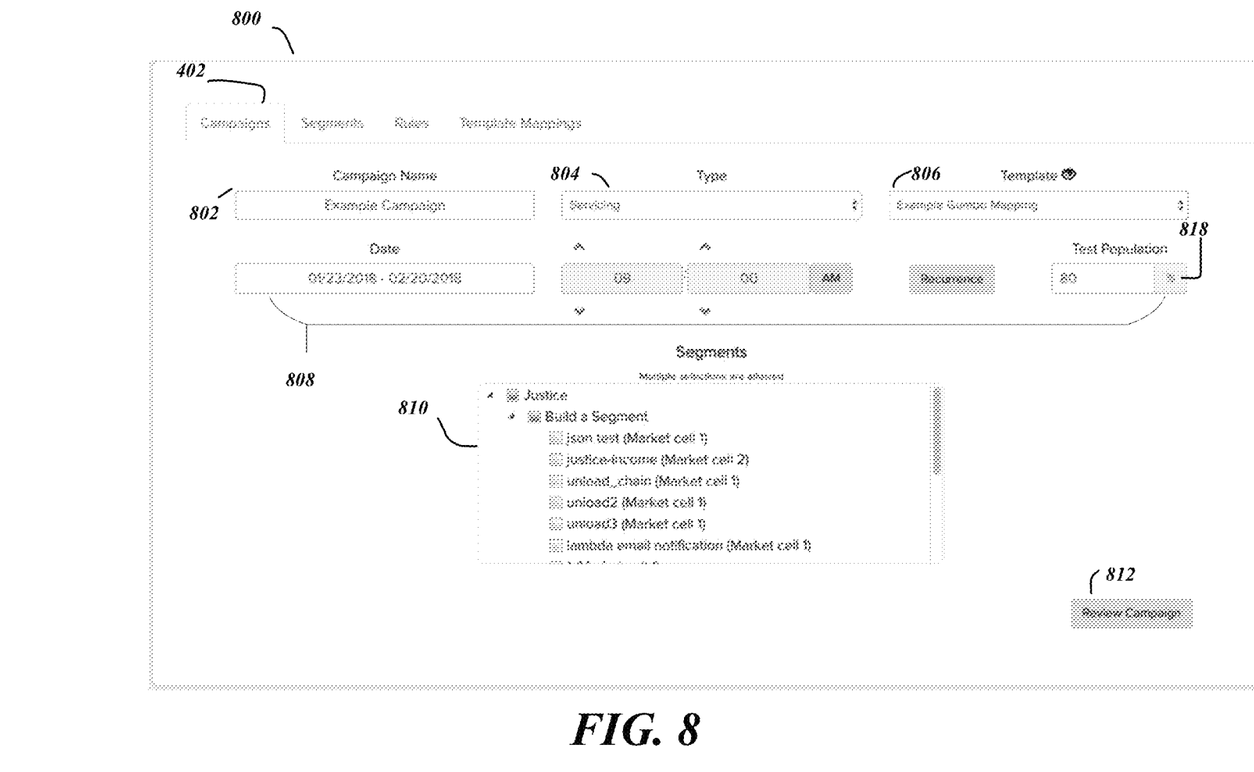
FIG. 8 illustrates a GUI window that provides a user the chance to review a campaign built using user input parameters as described in FIG. 4 through FIG. 7.

FIG. 8 is a diagram illustrating a landing window 800 of a campaign execution service accessible to a user by selection of the campaign tab 402 is the dashboard window 400 (FIG. 4). The campaign execution service receives campaign information from the user, the campaign information including, for example, campaign identifiers such as campaign name field 802 and campaign type 804, campaign template mappings provided as a field entry of pull-down menu 806, campaign segment identifiers 810 and campaign broadcast attributes 808, for example specifying a frequency and/or duration of the campaign broadcast. The campaign broadcast attributes that further permit the user to apply filters to the campaign broadcast. For example, Test Population field 818 enables the user to limit the distribution of the campaign to only a select percentage of the population, leaving a 'control' segment of the target population which does not receive the campaign. With such a feature an analyst can identify how effective a campaign is by comparing the resultant behavior of the test and control segments of the population. A user can select one or multiple segments from a list of pre-existing segment definitions, where the pre-existing segment definitions include custom, user-defined segment definitions, and general-purpose segment definitions.

Once the user defines the campaign, the user selects button 812 to review details of the campaign. An example of a landing window 900 for campaign review is provided in FIG. 9. The landing window campaign identification information 902, including name, creator, type and status information. The landing window also includes campaign specific links 906, for example, an audit documentation location that stores the content and target segment associated with the campaign. A user may review the content, or in some embodiments may forward the campaign up the hierarchy for approval (although the present invention is not limited to any embodiment which requires approval). For campaigns requiring approval, the user selects button 908. A user may further modify the campaign by selecting button 904 to edit the campaign.

Figure 9:
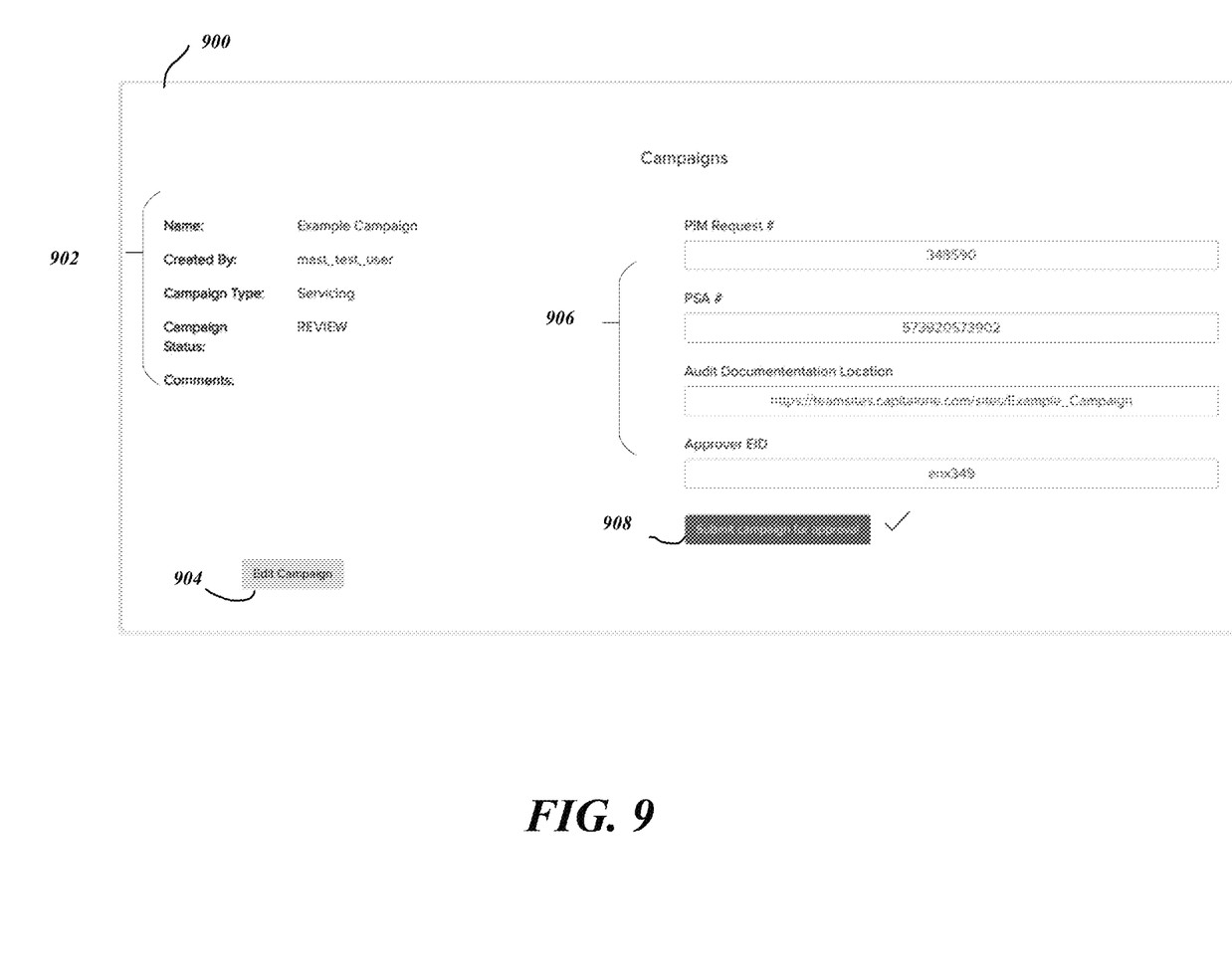
FIG. 9 illustrates a GUI window that permits a user to forward and review authorizations related to a campaign built using the campaign server of the present invention.

Referring back to FIG. 2, the interactions between the user, campaign server and database in the generation of campaign content and execution of the campaign as discussed with regards to FIGS. 7-9 will be now be described in more detail. At step 206 the user defines the campaign, for example by template mapping as described in FIG. 7 and campaign building as described in FIG. 8. Resulting campaign definitions 215 are forwarded to the campaign server which operates to build the campaign 225 at steps 216. In the event that the campaign 225 requires approval (wherein dashed lines are used to indicate that such step is optional), a user issues an approval request at step 208 (as described with regard to FIG. 9), and when the approval is received confirms the launch at step 210.

The launch of the campaign by the user at causes the campaign server at step 218 to gather updated member information for the target population. As described above, the target population information is periodically automatically updated and stored in working tables 225a-225c so that the most current member information is available when the campaign is launched at step 222. Because this update occurs in the background, the delays associated with identifying members of a target population are no longer a bottleneck to campaign design.

Following launch, at step 212 user collects data and analyze the results and effectiveness of the campaign. Such analysis may include polling the target population periodically to determine which members manifested interest in the campaign by accessing campaign content or availing themselves of product offerings. Using this information, the user may return to step 206, to adjust elements of the campaign to improve the efficacy and impact.

Accordingly, a campaign server which provides a significant benefit over the prior art has been shown and described. The campaign server includes a straightforward GUI which facilitates the entry of complexly tailored segment definitions to improve targeting of campaign efforts. Targeting accuracy is further improved by a targeting engine which periodically updates the member information for defined target population segments so that the member information is current when a campaign is launched. Existing member population data is advantageously leveraged for marketing purposes by using knowledge about existing data structures to populate campaign content templates, thereby removing the need for independent data collection and providing campaign solutions for multiple clients without scaling concerns.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A campaign management system comprising:
   a processing device;
   program code, stored in non-volatile storage and operable when executed upon by the processing device to provide a user interface configured to:
   receive requests from a user of the processing device, the requests relating to a campaign directed at a target segment of a population;
   manage and display results of the campaign including:
      identifying the target segment of the population against which the campaign is to be applied in response to rules related to with target attributes provided as user input at the interface
      translating rules received from the user and relating to the target segment, into a list of one or more database queries comprising a script;
      periodically and automatically executing the script upon a coupled dynamic data source comprising a plurality of target populations, each target population comprising a plurality of targets having a plurality of attributes, to capture changes to the target segment as a dynamically updated target segment for use by the campaign build unit, wherein the dynamically updated target segment is determined by:
         periodically storing, in a worker table, members of the population;
         periodically storing, in a child table, a subset of the worker table including members of the population selected in response to the rules related to target attributes; and
         storing, in an audit table, for each rule, a count of members included in the worker table and omitted from the child table as a result of the application of each rule to the worker table; and
      distributing a campaign built in accordance with user instructions to the dynamically updated target segment stored in the member table.

2. The campaign management system of claim 1 wherein the program code is configured to enable the user to select the target segment of the population for delivery of the campaign.

3. The campaign management system of claim 2 wherein target segments available for selection by the user are limited according to access privileges of the user.

4. The campaign management system of claim 1 wherein the program code is configured to automatically generate campaign correspondence in response to user instructions and a set of one or more predetermined templates.

5. The campaign management system of claim 4 wherein the program code generates a campaign in response to user instructions specifying at least one of a type, duration and frequency of the campaign.

6. The campaign management system of claim 4 wherein the predetermined templates comprise mapping information relating an attribute of a member to a location in a data store.

7. The campaign management server of claim 1, wherein the rules received from the user are received in a human-readable JSON text objects and the program code translates the rules into SQL database queries.

* * * * *